US006841101B2

(12) United States Patent
Nakos et al.

(10) Patent No.: US 6,841,101 B2
(45) Date of Patent: Jan. 11, 2005

(54) PRODUCTION OF HIGH ADDED VALUE PRODUCTS FROM RESIN-BONDED WASTE COMPOSITE WOOD PRODUCTS

(75) Inventors: Panagiotis Nakos, Salonika (GR); Eleftheria Athanassiadou, Salonika (GR); Joao Manuel Aires Coutinho, Nadadouro (PT)

(73) Assignee: Chitnar Hellas S.A., Salonika (GR)

( * ) Notice: Subject to any disclaimer, the term of this patent is extended or adjusted under 35 U.S.C. 154(b) by 94 days.

(21) Appl. No.: 10/130,732

(22) PCT Filed: Dec. 4, 2000

(86) PCT No.: PCT/GR00/00038

§ 371 (c)(1),
(2), (4) Date: Aug. 15, 2002

(87) PCT Pub. No.: WO01/39946

PCT Pub. Date: Jun. 7, 2001

(65) Prior Publication Data

US 2003/0056873 A1 Mar. 27, 2003

(30) Foreign Application Priority Data

Dec. 2, 1999 (GB) .............................................. 9928554

(51) Int. Cl.[7] ........................... D21B 1/16; B29B 17/00; C08J 11/10; C08J 11/14; B29C 43/00

(52) U.S. Cl. .................. 264/36.1; 264/37.28; 264/37.3; 264/82; 264/322; 264/914; 156/94; 156/256; 156/327; 162/234

(58) Field of Search .......................... 156/94, 327, 256; 264/36.1, 37.28, 37.3, 82, 322, 914; 162/234

(56) References Cited

U.S. PATENT DOCUMENTS

| | | | | | |
|---|---|---|---|---|---|
| 3,907,630 | A | * | 9/1975 | Selander | 162/13 |
| 4,857,145 | A | * | 8/1989 | Villavicencio | 162/19 |
| 5,425,976 | A | * | 6/1995 | Clarke et al. | 428/105 |
| 5,624,616 | A | * | 4/1997 | Brooks | 264/83 |
| 5,705,001 | A | * | 1/1998 | Iwata et al. | 156/62.2 |
| 5,804,035 | A | * | 9/1998 | Michanickl et al. | 162/91 |
| 5,866,057 | A | * | 2/1999 | Roffael | 264/113 |
| 6,435,433 | B1 | * | 8/2002 | Hesch | 241/186.35 |
| 6,589,660 | B1 | * | 7/2003 | Templeton et al. | 428/452 |

FOREIGN PATENT DOCUMENTS

| | | | | | |
|---|---|---|---|---|---|
| JP | 58-147345 | A | * | 9/1983 | B29J/5/00 |
| JP | 02-229002 | A | * | 9/1990 | B27L/11/00 |
| WO | WO 98/24605 | A1 | * | 6/1998 | B27N/1/00 |

OTHER PUBLICATIONS

JPO Abstract of JP 58–147345 A, 1998, Japanese Patent Office.*

JPO Abstract of JP 02–229002 A, 1998, Japanese Patent Office.*

* cited by examiner

*Primary Examiner*—Michael P. Colaianni
*Assistant Examiner*—Michael I. Poe
(74) *Attorney, Agent, or Firm*—Ladas & Parry

(57) ABSTRACT

A method of producing dry processed fiberboards from resin-bonded waste composite wood products, wherein said wood products are chemically treated in a pre-heater unit of a refiner system under super-atmospheric pressure in the presence of steam to disrupt adhesive polymer bonds, formed into fibers in a subsequent disc refiner unit of the refiner system and further processed by a dry process to form fiberboards.

17 Claims, No Drawings

PRODUCTION OF HIGH ADDED VALUE PRODUCTS FROM RESIN-BONDED WASTE COMPOSITE WOOD PRODUCTS

The present invention relates to a process for the manufacture of dry processed fibreboard, using as raw material waste composite wood products such as particleboard, fibreboard, plywood, hardboard and oriented strand board (OSB).

Composite wood panels are prepared either from wood chips (particleboard), fibres (fibreboard, hardboard), strands (OSB) or from wood veneers (plywood), which are sprayed or coated with specially formulated adhesives and hot-pressed to form sheet products. Since introduced in the 1940's, there has been a growing demand for these products, which are suitable for a variety of applications including furniture and interior/exterior construction elements. This trend combined with the shrinking of wood resources worldwide has contributed to the problem of inadequate raw material supplies, which the wood panel industry is now facing.

At the end of their service life wood-based panels and products made therefrom become waste wood. Deploying in landfills is no longer considered as an acceptable solution for their handling, due to the high organic load included. Incineration on the other hand, is not more environmentally friendly, due to the creation of dioxins, carbon dioxide etc. The recycling of this waste to be employed as raw material for the composite panel industry, which traditionally makes use of wood processing residues, has hence gained more importance and been examined from earlier times. Technical problems and the lack of legislation have delayed, however, the industrial implementation of new technologies proposed.

A process for the recovery of wood chips from particleboards and other wood-based panels as well as production residues and wastes, is described in DE-AS 1201045 by Sandberg (1963). This process involves treatment with steam in a steam chamber at a pressure between 1 and 5 atm above atmospheric pressure and for 0.5–4 h. The hydrolysis of the bonding resin leads to the disintegration of the boards into chips. The processed materials are not fully disintegrated, however, and further mechanical treatment is needed to separate the recovered wood chips from each other. Furthermore, the chips are considerably damaged and turn brown, by the use of high temperature and pressure for a prolonged period of time. Using the recovered chips, chipboard with acceptable properties can be produced only if fresh chips are added.

DE 4201201 (Moeller, 1992) specifies a method for the recycling of wood derived products and wood-containing waste based on a special mechanical treatment, which enables the production of wood flakes suitable for bonding into new semi-finished or finished products. However, the recovered flakes still contain the residues of the binder resin and therefore exhibit a high formaldehyde release.

Another recycling process for UF-bonded particleboards and fibreboards whether or not laminated is included in DE 4224629 (1992). The boards are initially broken down into pieces of the size of a few cm and any metal components are removed. The board residues are then subjected to saturated steam treatment in an autoclave at temperatures between 120–180° C. and pressures of 2–11 bar for 2–5 min. The secondary wood elements thus obtained can be separated from the laminates, covers and non-metal parts by sieving and/or sorting and re-bonded to panels with modified/conventional urea-formaldehyde (UF) resins or other binders like phenol-formaldehyde (PF) resins. A disadvantage of this process is that the recovered elements are damaged not only due to the high temperature and pressure treatment, but also due to the initial mechanical disintegration. This thorough crushing procedure further complicates the separation of secondary wood elements from coating materials and other undesired components. Also a major disadvantage is the expensive equipment involved.

Roffael and Dix (U.S. Pat. No. 5,705,542, 1994) have developed a process in which waste particleboards and fibreboards bonded with either UF, PF or polymeric 4,4'-diphenyl-methane-diisocyanate (PMDI) adhesives are first chopped and subsequently subjected to chemical-thermal pulping according to the sulphate, sulphite and organosolv process. The treatment results in the production of a cellulose product and spent liquor, which contains not only the degradation products of the wood material, but also those of the bonding agent originally employed in the boards. This spent liquor after concentration and pH adjustment can be employed as an extender for wood bonding agents such as UF, PF, tannin-formaldehyde (TF), starch, pectine, starch acetate, starch propionate and protein. The cellulose material can be applied in paper or fibreboard production. This process also makes use of high temperature (180° C.) and pressure treatment of a long duration (30/60 min). These affect negatively both the quality of the fibres obtained and the process economics.

Roffael in a later application (WO 9824605, 1997) proposed the recycling of waste composite materials by a combination of hydrothermal and high shear treatment at 40–120° C. The composite materials are first disintegrated to chips and then subjected to the hydrothermal and high shear treatment, which can be carried out in a twin screw extruder device or an attrition mill. Fibres or particles are thus recovered, suitable for the manufacture of composite panels like particleboard and medium density fibreboard. Chemicals can be added during the treatment to improve the quality of the particles/fibres obtained. These include acids, metal hydroxides, salts, oxides, amines, urea, ammonia or even components of the bonding resin mixture or the resin itself. Process deficiencies represent, however, the high cost equipment employed and the quality difference between the particles/fibres obtained as compared to the conventional ones used for board manufacture.

Michanickl further proposed (U.S. Pat. No. 5,804,035, 1995) another treatment for wood-containing materials like waste chipboard and/or medium density fibreboard, as well as production residues and spoilage. Pieces of such materials with edge length of approx. 10–20 cm are filled into a static or rotating disintegration boiler/pressure vessel, where they are impregnated with an impregnating solution for at least one minute and allowed to swell until they have absorbed at least 50% of their own weight in impregnating solution. The impregnating solution consists of water and chemicals at a maximum total concentration of 30%. Suitable chemicals are urea, ammonia, soda lye, sulphuric acid, UF resins and the like. The impregnated wood-containing materials are subsequently heated to temperatures between 80 and 120° C., for a time period of 1–60 min and pressure not exceeding 2 bar above ambient atmospheric pressure. Thereafter, the disintegrated material (chips and fibres) is separated from other components like coatings and metal parts by sieving and/or wind screening and use of metal detectors and can be further processed into chipboard or fibreboard. DE 19819988 (1998) describes the same process in continuous operation. However, this technology is effective only for UF-bonded boards and its application is limited to the production of particleboard with no more than 20% substitution of fresh wood particles by the recovered ones.

A quite similar process, employing a specially designed apparatus for the steam treatment and subsequent screening of the waste, has recently been described in PCT/GB99/00690 (Sandison-Thorpe, 1999) and is still under development.

In all of the above recycling processes special equipment is required for the treatment of the waste, which in most cases is of high cost (e.g. autoclave, extruder) and unconventional in standard board manufacturing processes. This means that existing plants will need to make additional investment in equipment to be able to use recycled wood particles/fibres. Furthermore, the severe prolonged temperature and pressure treatment employed in some of these processes lead to wood particles/fibres with deteriorated properties. Recycling processes based on mechanical treatment provide, however, coarse recycled wood particles. The replacement levels of fresh wood particles/fibres achieved till today are low and lie mainly in the field of particleboard production. Problems like the formaldehyde release of the recycled panels and the manipulation of potential process effluents have not been effectively resolved. Most importantly, though there are brief references to continuous operation, in practice continuous board manufacture using waste products has not been realised so far and all of these above processes are primarily batch operations.

An objective of the present invention is to provide a process of manufacturing dry processed fibreboard by effectively recycling waste wood-containing products, that eliminates the problems connected with all the previous ones by combining the advantages of employing conventional equipment, producing quality fibres out of waste, achieving high recycling efficiency, standard final product properties, continuous operation and low cost.

Another objective of the invention is to recover valuable raw materials from waste products such as composite wood panels bonded with urea-formaldehyde resins, phenol-formaldehyde resins, melamine-formaldehyde resins, isocyanates as well as their combinations.

It is a further objective of the invention to produce commodity dry processed fibreboard which satisfy the overall requirements with respect to their mechanical strength, water resistance and emission behaviour.

It has surprisingly been found that waste wood products such as particleboard, fibreboard, oriented strand board (OSB), plywood, hardboard and the like, as well as their production residues can be processed in a conventional pressurised refiner system employed in the fibreboard industry, to obtain fibres suitable for the production of fibreboards according to the dry process.

According to the invention there is provided a method for producing composite products with a higher proportion of recycled fibre in the final product, wherein waste composite wood products bonded with a wide range of adhesives are recycled through a continuously operated conventional dry fibreboard process, in which the pre-heater and/or refining steps are modified from conventional conditions to enable the increase in yield in proportion of fibre recycled.

It was surprising to find that recycle of significant amounts of composite was possible by a fibreboard process. By significant is meant amounts substantially in excess of 5% by weight of the feed of fresh wood material to the process.

The process known as "dry process" for the manufacture of fibreboards and the product "dry processed fibreboard" are well characterised in the field of composite panels manufacture, the process involving certain conventional stages operated usually under well established standard conditions. Thus for example a dry processed fibreboard is distinguished from wet processed fibreboard (hardboard) or products such as chipboard (particleboard) etc. The present invention involves modification of these standard conditions of conventional steps. The extent of modification required is measured by the extent of amount of recycled material employable.

More specifically the waste products are first reduced in size by using appropriate devices and after the removal of metal components are then soaked in water at room temperature. They are subsequently passed to a pre-heater (a common part of the pressurised refiner system), where they are treated with steam and chemicals. This treatment enables the disruption of the wood-adhesive polymer bond and the recovery and formation of individual wood fibres in the refiner unit, which follows. The recovered fibres after exit from the refiner unit, enter the blow line section of the fibreboard plant. A blow line is a conventional device used in most fibreboard plants to enable the complete mixing of the bonding mixture with the wood fibres. By entering the blow line section, the fibres are expanded and thus separated from each other and at a later point are sprayed with the bonding mixture, while turbulent flow conditions prevail. The fibres are next passed to a dryer unit. The dried fibres are formed to mats and hot pressed to fibreboards. This procedure is almost identical to the standard dry process for the production of fibreboards using fresh wood as raw material.

In the process of the invention there is provided in a standard fibreboard production process a feed containing recycled composite material (particularly a composite material comprising primarily wood particles/fibres) under such conditions that a satisfactory composite product can be produced.

Normally the amount of recycled material employed will greatly exceed 5% by weight of the feed of fresh wood material and indeed the recycled material may comprise up to all of the feed.

Usually to enable a satisfactory product to be obtained at this level of recycle there will have to be modification of one or more of the processing steps. For example, the conditions of pre-heater treatment (pressure, temperature, duration, use of or change in amounts or nature of chemicals), the refiner conditions or configuration including design of refiner segments may be modified from currently used conditions or design. For example in the pre-heater one may use chemicals to assist in hydrolysing bonding materials in the recycled material.

The precise degree or nature of modification which may be required for a given level of recycle of composite material can readily be determined once the possibility of successful recycle of significant amounts of composite in a fibreboard process has been appreciated.

Accordingly, this invention provides a process for the manufacture of dry processed fibreboard using as raw material waste wood products, which comprises the following steps:

1. Size reduction of the waste material
2. Removal of metal parts (if necessary)
3. Water soaking
4. Treatment in a pre-heater with steam and chemicals
5. Refining
6. Gluing, drying, mat forming and hot pressing.

One or more of these steps are subject to modification as outlined above.

The size reduction of the waste composite products into particles can be carried out in the conventional chipper or disintegration apparatus employed in fibreboard plants.

In this recycling process, the degradation of the polymeric bonds included in the waste products through the treatment in the pre-heater can be effected by the use of a weak/strong mineral acid or a weak/strong organic acid, a weak/strong inorganic/organic base, or their respective salts, formaldehyde inhibiting chemicals, surfactants or wetting agents. The use of such chemicals either alone or in combinations further improves the efficiency of the refiner unit and helps to reduce the dryer emission levels. The level of such use lies in the area of 0.01–10% by weight of such chemicals based on dry fibre weight. The chemicals are introduced into the pre-heater in the form of solutions through appropriate nozzles and separately from the steam.

The working temperature and pressure conditions as well as the duration of the treatment in the pre-heater fall in the normal range employed in the dry processed fibreboard industry and no effluents are created during pre-heater operation. The water employed for preliminary soaking of the waste wood products is reused continuously.

By application of the process of the invention, dry processed fibreboard can be prepared from a mixture of fresh and recycled wood-containing material or exclusively from recycled material, with minor modifications in the equipment of an existing plant, which means that low additional investment is needed, and no process/continuous operation interruption.

One or more pre-heater and one or more refiner devices may be required when adopting the new process, however this is the normal practice for a typical fibreboard manufacturing installation. Alterations in the refiner configuration and/or in the design of refiner segments may be needed for process implementation. For example and depending on the case the space between refiner disks may need to be increased by at least 10%.

An important feature of the proposed recycling process is that no separation of the board laminates or overlays is needed, unless they contain contaminating chemicals restricted for use in modern panels, for example chlorinated hydrocarbons, wood preservatives, etc.

One further advantage of the process of the invention is that, depending on the working conditions (temperature, pressure, duration of treatment, concentration of chemicals) employed in the pre-heater, part or all of the bonding resin present in the waste boards can be reactivated thus leading to a reduction of the resin consumption of the new boards to be formed.

The dry processed fibreboard obtained by the process of the present invention can be compared in quality and applications with those produced conventionally from fresh wood and no special handling is needed during their processing into commodity products.

The following examples further illustrate the embodiments of the invention without restricting its views and purpose.

EXAMPLE 1

A random mixture of waste medium density fibreboards (MDF) bonded with either urea-formaldehyde or melamine-urea-formaldehyde resin, paper laminated medium density fibreboards and finally coloured medium density fibreboards were mechanically disintegrated into chips and subsequently soaked in water together with pine wood chips at a ratio of 1:1 waste material to fresh wood (50% replacement of the feed with recycled material). After separation of the non-retained water the mixture of fresh and recycled material was fed to the pre-heater of an industrial MDF plant, where it was treated at 170° C. for 3 min, by injecting steam and aqueous solution of $Na_2SO_3$. The quantity of $Na_2SO_3$ employed was 1% by weight based on dry wood-containing material weight. The treated material was then formed into fibres after passing through the refiner unit and mixed with urea-formaldehyde resin in the plant blow line section. After fibre drying and mat formation, fibreboards were hot-pressed according to standard plant operating conditions at a final thickness of 22 mm. The properties of the boards were evaluated in comparison with those of medium density fibreboards prepared under standard operating conditions and using fresh pine wood as feed (blank system). It should be noted that the same resin level was used in both systems (13% w/w). The values of board properties are presented below:

| | Blank system | Recycled MDF |
|---|---|---|
| Density, $Kg/m^3$ | 746 | 743 |
| Internal Bond, $N/mm^2$ | 0.93 | 0.96 |
| 24 h thickness swell, % | 3.8 | 3.6 |
| Free formaldehyde, mg/100 g board | 45.52 | 27.25 |

The free formaldehyde content was determined by using the Perforator method.

As it can be seen from the above industrial test, the recycled fibreboards produced according to the process of the invention have improved tensile strength (Internal Bond) and water resistance (thickness swelling after immersion in water for 24 h) in comparison with the blank boards. More important and surprising is the fact, that there is a 40% reduction of free formaldehyde content in the recycled fibreboards as compared to the blank boards.

The appearance of the recycled fibreboards did not differ from that of the boards conventionally produced and thus no problems were detected for board finishing with paper coating, veneering etc.

EXAMPLE 2

A random mixture of waste MDF bonded with either urea-formaldehyde or melamine-urea-formaldehyde resin, veneered MDF and hardboards were mechanically disintegrated into chips and subsequently soaked in water together with pine wood chips at a 60% replacement of the feed with recycled material. After separation of the non-retained water the mixture of fresh and recycled material was fed to the pre-heater of an industrial MDF plant, where it was treated at 170° C. for 3 min by injecting steam and aqueous solution of $Na_2SO_3$ and NaOH. The quantities of $Na_2SO_3$ and NaOH employed were 1 and 0.2% by weight based on dry wood-containing material weight respectively. The treated material was then formed into fibres after passing through the refiner unit and mixed with urea-formaldehyde resin in the plant blow line section. After fibre drying and mat formation, fibreboards were hot-pressed according to standard plant operating conditions at a final thickness of 12 mm. The properties of the boards were evaluated in comparison with those of medium density fibreboards prepared under standard operating conditions and using fresh pine wood as feed (blank system). It should be noted that the same resin level was used in both systems (7% w/w). The values of board properties are presented below:

| | Blank system | Recycled MDF |
|---|---|---|
| Density, Kg/m$^3$ | 799 | 793 |
| Internal Bond, N/mm$^2$ | 0.88 | 1.02 |
| 24 h thickness swell, % | 11.8 | 11.8 |
| Free formaldehyde, mg/100 g board | 35.22 | 21.40 |

The free formaldehyde content was determined by using the Perforator method

The above results confirm that the recycled fibreboards produced according to the process of the invention have improved properties as compared to the blank boards and this is more important in the case of free formaldehyde content, where a 40% reduction is observed in the recycled fibreboards as compared to the blank boards.

The appearance of the recycled fibreboards was not different from that of the boards conventionally produced and thus no problems were detected for board finishing with paper coating, veneering etc.

What is claimed is:

1. A method of producing dry processed fibreboards from resin-bonded waste composite wood products, wherein said wood products are chemically treated in a pre-heater unit of a refiner system under super-atmospheric pressure in the presence of steam to disrupt adhesive polymer bonds, formed into fibres in a subsequent disc refiner unit of the refiner system and further processed by a dry process to form fibreboards with a reduction of resin consumption by the reactivation of resin in said wood products.

2. A method according to claim 1, wherein the waste composite wood products used for recycling comprise particleboard, fibreboard, oriented strand board (OSB), plywood, hardboard as well as their production residues.

3. A method according to claim 1, wherein said fibres are hot-pressed into medium density fibreboards.

4. A method according to claim 1, wherein the waste composite wood products used for recycling constitute over 5% by weight of a feed of fresh wood material.

5. A method according to claim 1, which provides dry processed fibreboards prepared exclusively from recycled wood-containing material.

6. A method according to claim 1, wherein dry processed fibreboards are produced under continuous operation by recycling waste composite wood products.

7. A method according to claim 1, wherein the treatment in the pre-heater is in the presence of weak or strong acids, weak or strong bases, their respective salts, formaldehyde inhibiting chemicals, surfactants or wetting agents.

8. A method according to claim 7, wherein the introduction of chemicals in the pre-heater step is in an amount of from 0.01 to 10% by weight based on dry fibre weight.

9. A method of producing a dry processed fibreboard comprising (a) providing a resin-bonded waste composite wood product;

(b) soaking the waste composite wood product in water to form a water-soaked waste composite wood product;

(c) feeding the water-soaked waste composite wood product into a pre-heater unit of a refiner system and chemically treating the water-soaked waste composite wood product in the pre-heater unit under super-atmospheric pressure in the presence of steam to disrupt adhesive polymer bonds;

(d) refining the treated waste composite wood product into recycled fibres in a subsequent disc refiner unit of the refiner system; and (e) processing the recycled fibres into a fibreboard by a dry process with a reduction in resin consumption by the reactivation of resin in said wood product comprising mixing the recycled fibres with a bonding resin, drying the recycled fibres, forming the dried fibers into mats; and hot pressing the mats to form the dry processed fibreboard.

10. The method according to claim 9, wherein the resin-bonded waste composite wood product is bonded with a resin selected from the group consisting of a urea-formaldehyde resin, a phenol-formaldehyde resin, a melamine-formaldehyde resin, an isocyanate and a mixture thereof.

11. The method according to claim 10, wherein the chemical treating in the pre-heater unit is in the presence of a weak or strong acid or a salt of the weak or strong acid, a weak or strong base or a salt of the weak or strong base, a formaldehyde inhibiting chemical, a surfactant or a wetting agent.

12. The method according to claim 10, wherein the water-soaked waste composite wood product is fed into the pre-heater with fresh wood material, the recycled fibres comprising at least 20% by weight of a fibre content of the dry processed fibreboard.

13. The method according to claim 12, wherein the bonding resin is used in the dry process at a level of at least 7% w/w.

14. The method according to claim 12, wherein the method comprises a step of reducing the size of the resin-bonded waste composite wood product prior to step (b).

15. The method according to claim 14, wherein the process consists essentially of steps (a) to (e) and the step of reducing the size of the resin-bonded waste composite wood product.

16. The method according to claim 15, wherein the bonding resin is a urea-formaldehyde resin.

17. The method according to claim 15, wherein the treatment of step (c) is conducted at a temperature of about 170° C.

* * * * *